(12) United States Patent
Attili et al.

(10) Patent No.: US 11,020,678 B2
(45) Date of Patent: Jun. 1, 2021

(54) COMFORT-INDUCING PROXY

(71) Applicants: Vennela Attili, Fremont, CA (US); Vijaya Mani Dulam, Fremont, CA (US); Ramesh Gowd Attili, Fremont, CA (US)

(72) Inventors: Vennela Attili, Fremont, CA (US); Vijaya Mani Dulam, Fremont, CA (US); Ramesh Gowd Attili, Fremont, CA (US)

( * ) Notice: Subject to any disclaimer, the term of this patent is extended or adjusted under 35 U.S.C. 154(b) by 0 days.

(21) Appl. No.: 16/819,774

(22) Filed: Mar. 16, 2020

(65) Prior Publication Data
US 2020/0391125 A1 Dec. 17, 2020

Related U.S. Application Data

(60) Provisional application No. 62/862,260, filed on Jun. 17, 2019.

(51) Int. Cl.
*A63H 3/00* (2006.01)
*A63H 3/02* (2006.01)
(Continued)

(52) U.S. Cl.
CPC .............. *A63H 3/001* (2013.01); *A63H 3/02* (2013.01); *A63H 3/28* (2013.01); *G05B 19/042* (2013.01); *G06F 3/165* (2013.01); *G06F 13/4282* (2013.01); *G06N 3/008* (2013.01); *H04R 1/028* (2013.01); *H04R 1/08* (2013.01); *A63H 11/00* (2013.01); *A63H 2200/00* (2013.01); *G05B 2219/25252* (2013.01); *G05B 2219/2666* (2013.01); *G06F 2213/0042* (2013.01)

(58) Field of Classification Search
CPC . A63H 3/001; A63H 3/02; A63H 3/28; A63H 11/00; A63H 2200/00; G05B 19/042; G05B 2219/25252; G05B 2219/2666; G06F 3/165; G06F 13/4282; G06F 2213/0042; G06N 3/008; H04R 1/028; H04R 1/08
See application file for complete search history.

(56) References Cited

U.S. PATENT DOCUMENTS

| 10,201,236 B1* | 2/2019 | Cloud | A47G 9/1045 |
| 2007/0179334 A1* | 8/2007 | Groves | G09B 23/288 |
| | | | 600/28 |

(Continued)

*Primary Examiner* — Fan S Tsang
*Assistant Examiner* — David Siegel
(74) *Attorney, Agent, or Firm* — Donald R. Boys; Central Coast Patent Agency LLC

(57) ABSTRACT

A simulated living entity (SLE) HAS a body formed of cushioned material, a contact area on an surface of the body, a heating panel under the contact area, a microphone positioned proximate one end of the exposed surface, a speaker positioned proximate the microphone, a heartbeat simulator, a breath simulator proximate the microphone and speaker, and a control system within the body comprising a microprocessor, a coupled data repository, a power supply, wireless communication circuitry, and a digital bus. The heating panel heats the contact area, the heartbeat simulator provides feeling and sound of a beating heart, the breath simulator provides air intake and exhaust, and the speaker provides sounds of a person sleeping, synchronized with the breath simulator.

12 Claims, 4 Drawing Sheets

(51) Int. Cl.
*A63H 3/28* (2006.01)
*H04R 1/08* (2006.01)
*G06F 13/42* (2006.01)
*G06N 3/00* (2006.01)
*G05B 19/042* (2006.01)
*G06F 3/16* (2006.01)
*H04R 1/02* (2006.01)
*A63H 11/00* (2006.01)

(56) References Cited

U.S. PATENT DOCUMENTS

| | | | |
|---|---|---|---|
| 2009/0156089 A1* | 6/2009 | Hoard | A63H 3/001 446/297 |
| 2014/0082839 A1* | 3/2014 | Piombino | A47D 15/00 5/421 |

* cited by examiner

COMFORT-INDUCING PROXY

CROSS-REFERENCE TO RELATED APPLICATIONS

The present application claims priority to provisional application U.S. 62/862,260, filed Jun. 17, 2019. All disclosure of the parent application is incorporated at least by reference.

BACKGROUND OF THE INVENTION

1. Field of the Invention

The present invention is in the technical area of apparatus mimicking traits or functions of humans or other animals, and pertains more particularly to a simulated apparatus exhibiting sensible attributes of a living animal.

2. Description of Related Art

It is well known in the art that humans are social animals, and have a strong affinity for close sensible relationship to other humans. A particular case in point is the affinity of a child for a parent, particularly a young child for a mother. Human babies, for example, are known to suffer developmental retardation in the absence of sensible ongoing relationship with a mother figure. It is believed by many that emotional well-being of young humans is dependent to an extent on a close and trusting relationship. Such a relationship however, is not always available when needed.

Automated stuffed animals, such as teddy bears, as well as dolls of many sorts are well-known in the art. Typically, those known in the art are automated in a way to provide a play experience, a learning experience, or another sort of interactive experience, usually with a child. Many also may make music or talk to the child, such as by recorded speech.

The present inventor is a child who has sleep issues and is largely unable to sleep unless her mother lies with her and pats her back or stomach for a time until she falls asleep. A problem is that the mother often falls asleep first, or has to get up and attend other duties. It is believed that the feature that calms the child to be able to sleep is the experience of the presence of a living entity.

What is clearly needed is an apparatus that simulates attributes of a living being in a manner that a subject who may have difficulty sleeping or may be anxious for some reason may relate in a way that the anxiety is reduced or sleep may be induced. Such an apparatus may have a calming influence and may therefore be emotionally beneficial.

BRIEF SUMMARY OF THE INVENTION

In one embodiment of the invention a simulated living entity (SLE) is provided, comprising a body having a length substantially greater than a width, formed of cushioned material, a contact area on an surface of the body exposed with the body lying on a supporting surface, the contact area comprising at least 50% of the exposed surface, a heating panel under the contact area providing heat to regulate temperature of the contact surface, a microphone positioned proximate one end of the exposed surface, a speaker positioned proximate the microphone, a heartbeat simulator positioned centrally on the exposed surface, a breath simulator proximate the microphone and speaker, and a control system within the body comprising a microprocessor, a coupled data repository, a power supply providing power to electrical and electronic elements through electrical conductors, wireless communication circuitry, and a digital bus interconnecting the microprocessor and other digital elements through which control of the digital elements is accomplished. The heating panel heats the contact area to a temperature simulating the skin temperature of a living person, the heartbeat simulator provides feeling and sound of a beating heart of a person at rest, the breath simulator provides air intake and exhaust at a rhythm and rate simulating breathing of a person asleep, and the speaker provides sounds of a person sleeping, synchronized with the breath simulator.

In one embodiment the body is in the form of a stuffed animal. Also, in one embodiment the body is in the form of a Teddy Bear. In one embodiment the power supply is a rechargeable battery with a charging port in a surface of the SLE. And in one embodiment the SLE further comprises a USB port providing input for programming the microprocessor of the control system.

In one embodiment of the invention the SLE further comprises a stretch simulator providing small movements of the body. In one embodiment the SLE further comprises a mobile communication device as a part of the control system, in communication with the microprocessor. Also in one embodiment the SLE further comprises an application executing on the mobile device providing an interactive interface on a display of the mobile device enabling control of other elements of the control system of the LSE. The interactive interface may provide command inputs enabling raising and lowering of temperature of the heating panel under the contact area. In one embodiment the interactive interface provides command inputs enabling changing the rate and strength of the heartbeat simulated. In one embodiment the interactive interface provides command inputs enabling changing the rate, rhythm and sound provided by the breath simulator. And in one embodiment the interactive interface provides command inputs enabling playing music through the speaker.

DETAILED DESCRIPTION OF THE INVENTION

Figure 1:
FIG. 1 is an elevation view of a Happy-Sleep Teddy Bear in an embodiment of the present invention.

FIG. 1 is an elevation view of a Happy-Sleep Teddy Bear 101 in an embodiment of the present invention, lying beside and sharing a sleeping arrangement with the inventor. The application of a Teddy Bear is just one example in many embodiments of the invention.

Teddy Bear 101 has internal mechanisms, not seen in FIG. 1, but described below in enabling detail, that provide for certain motions and functions of the Teddy Bear in embodiments of the invention. In one implementation Teddy Bear 101 has a stick or paddle 102 in one hand, and a mechanism that is adapted to move the stick or paddle 102 in a vertical orientation, such that a tip of the stick or paddle may be in contact with the inventor's body, such as back or stomach area, and may repeatedly tap or pat the person lying with the Teddy. This motion is intended to convey a feeling to the person lying with the teddy bear that there may be a real person providing the motion.

Figure 2:
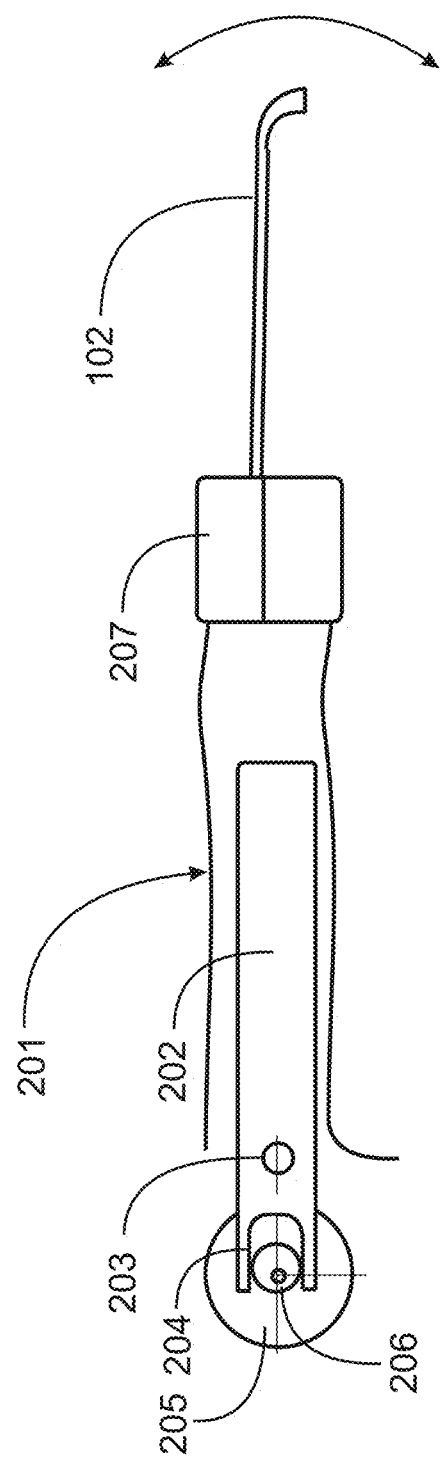
FIG. 2 is a diagram illustrating a mechanism in the Teddy Bear of FIG. 1.

FIG. 2 is an illustration of an arm 201 of Teddy 101 of FIG. 1. The arm ends in a paddle 102, and shows an internal link 202 pivoted at a pivot point 203. End 204 of link 202 engages a cam 206 driven by an electric motor 205. Each revolution of motor 205, which operates at a rather slow RPM, such as perhaps 1 RPM, causes the Teddy's arm, and also the paddle held by the arm to raise and lower, which simulates a patting motion which may be soothing to the person associated with the Teddy.

In some embodiments of the invention, wherein a patting motion is used, there may not be a paddle, but the arm of the Teddy, or of whatever simulated entity is represented, may simply be longer, to accommodate a reach over a sleeping child to be able to perform a patting motion on the abdomen or the back of the child.

Further to FIG. 2, the cam and motor means of moving the arm is just an example of a variety of ways that such motion might be accomplished. In alternative embodiments a simulated wrist may be implemented near an end of the arm, a mechanical means may be employed to move the wrist to impart a patting motion to a simulated hand at the end of the arm. In some embodiments the rate of the patting motion may be preprogrammed, and may be varied by a user.

In many embodiments of the invention the entity provided may not be a teddy bear, but may be a doll, or other simulated living entity. Accordingly, in references below, the text refers to a simulated living entity (SLE), which includes, for example, the Happy Sleep Teddy Bear.

Figure 3:
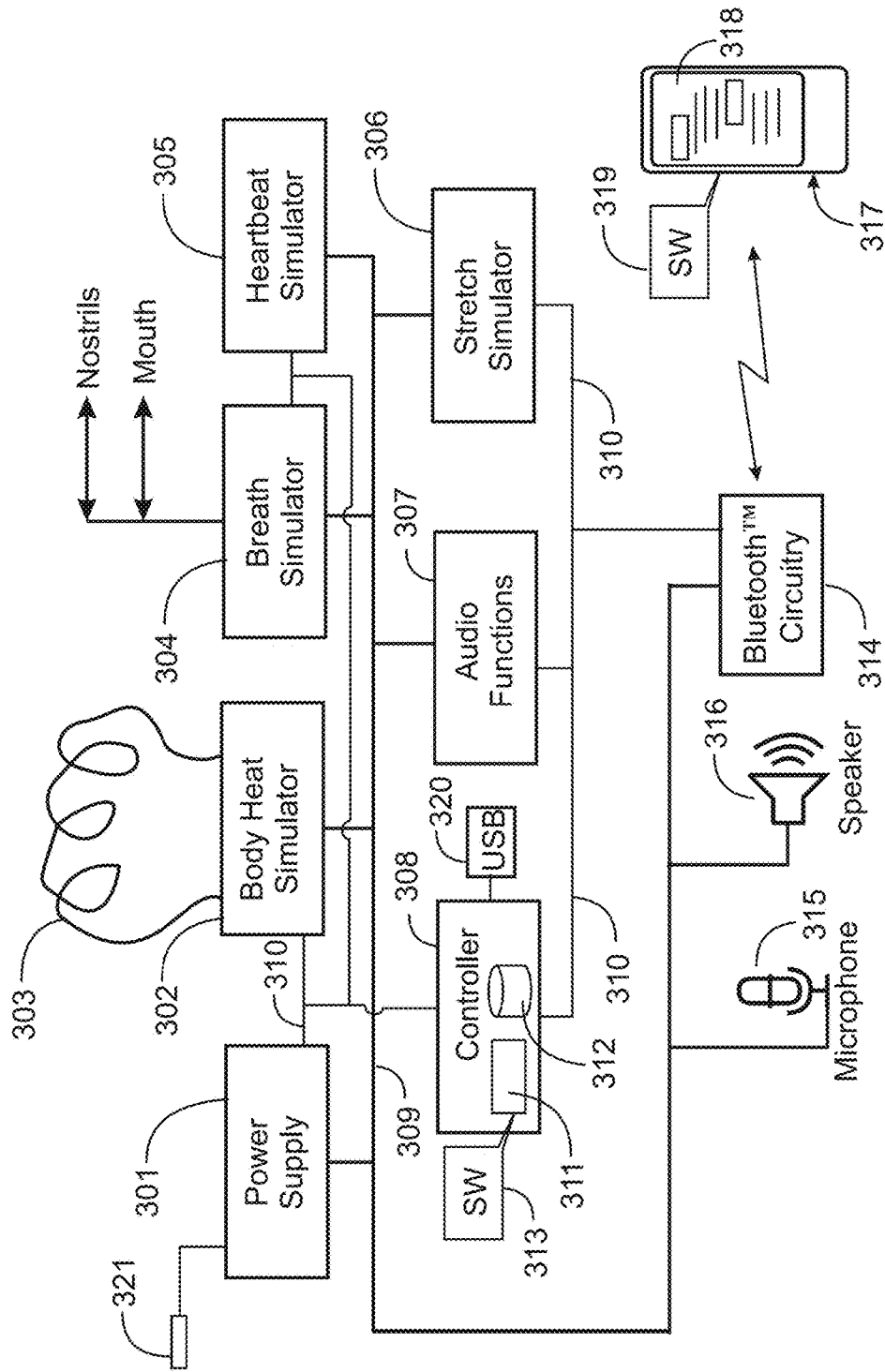
FIG. 3 is a diagram illustrating a number of sub-systems that may be present in a simulated person or animal in an embodiment of the invention.

FIG. 3 is a diagram illustrating a variety of elements and sub-systems that may be present and operable in a simulated person or animal in embodiments of the invention. The simulated living entity in most embodiments will have a power supply 301, which may be a rechargeable battery, or may be a direct line connection to an external power source, like a wall socket. Power is provided from power supply 301 via conductors 309 to various other elements as shown.

In some embodiments there may be a body heat simulator 302 to heat different parts of the SLE, to indicate to the subject that the SLE is alive. Heat may be provided in some instances through heater circuits 303, which may be resistance heaters, or may, in some circumstances be conduits through which heated liquid may be pumped. In some embodiments there may be heat panels in the SLE in different places.

In some embodiments there may be a breath simulator, which may circulate warm air, simulating inhalation and exhalation of warm air, which may be switched to nostrils or to the mouth of the SLE, with a goal of indicating a relaxed and perhaps sleeping person or animal.

A heartbeat simulator 304 may be present in some embodiments, providing the sound or the feel, or both, of a live beating heart in the SLE. The strength and rapidity of the heartbeat may be programmed and controllable.

A stretch simulator 306 provides small movements, such as a pet or a sleeping child may exhibit. Audio functions are provided through simulator 307, which may provide humming, breath sounds, lullabies, gentle words and phrases and the like, that may be seen to be comforting to a subject.

A controller 308 included s microprocessor 311 executing software (SW) 313 coupled to all elements through a digital bus system 310, and provides control of functions of the various simulators included. There may be sensors (not shown) sensing various conditions and reporting back to controller 308, and sensor readings may be used by SW 313 in orchestrating actions of the various simulators. There may also be a close range wireless communication capability, provided, for example, by Bluetooth™ circuitry 314, which may pair with compatible circuitry in a cellular telephone 317 with or other mobile devices such as a pad device, that may also have wireless circuitry.

In embodiments of the invention it is desired to provide a feeling of another person or at least a living presence to a subject, a child for example, in bed, who may have trouble falling asleep. This provision of the simulated presence of a living entity may also be comforting to a child, for example, who is ill, or isolated, or in any other circumstance that may produce anxiety. The activities of the simulated living entity as described herein in embodiments of this invention are intended to provide such an atmosphere or ambience, but not to interact with the subject in a waking relationship.

In one embodiment a microphone 315 may be implemented in the SLE, and may provide input from a subject in proximity, through the wireless circuitry, to cellular telephone 317, or to another paired device, such as a speaker. A remote person, such as a parent, for example, may provide verbal input, or music or aorher aidible material, to a speaker 316. Programming may be provided wirelessly as well in some embodiments, providing different programs for different purposes to the subject in proximity of the SLE.

There may be an application 319 executing on cellular telephone 317 with an interactive interface on display 318 through which a parent or other may interact with the SLE, verbally with the child through functions of the SLE, and may remotely configure and control activities and functions of the SLE.

In one embodiment in which the SLE may be a Teddy bear, there may be at least one camera, perhaps in one or both of the eyes, that can stream a live view of the child to the cellular telephone application. The interaction ability may enable a parent to interact with the child through the Teddy Bear, even from remote locations, for example, the parent is at work, and the child is napping at home.

In embodiments of an SLE described above, the SLE is in some instances a Teddy Bear, or some other entity in the form of a stuffed animal. Of course the animal need not be a bear, but might be a bunny, or a cat, for example. One element though to be important to an SLE according to embodiments of the invention is a substantial surface area which is presented in a way that there may be substantial intimate engagement with a subject's body. In the instance of a stuffed animal form, this surface area may be the frontal body area of the stuffed animal.

Figure 4:
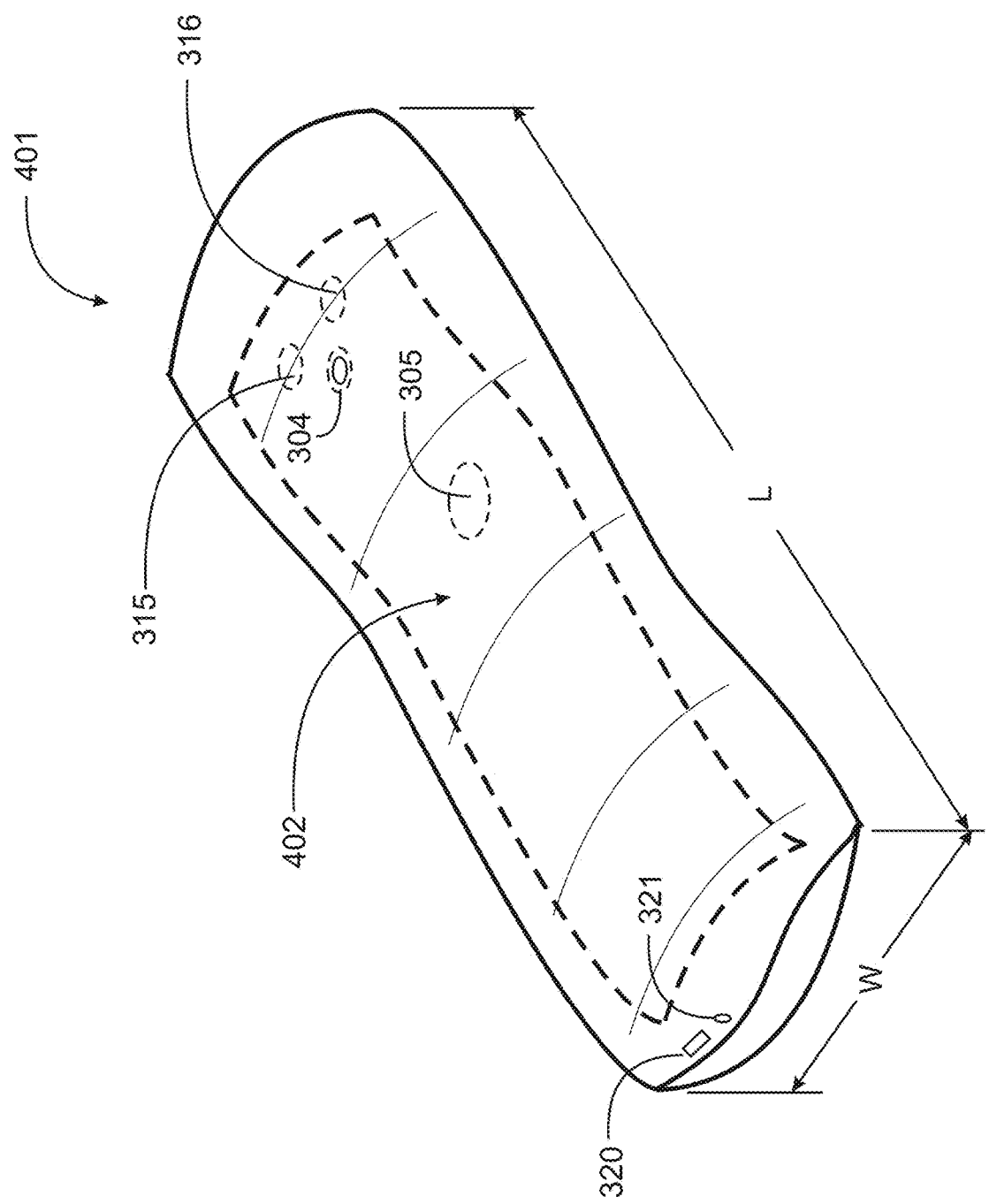
FIG. 4 is an illustration of a simulated living entity implemented in form of a body pillow.

In one embodiment of the invention the SLE need not be in the form of a doll or a stuffed animal, but may be in the visual form of an inanimate entity, such as a body pillow in one example. FIG. 4 illustrates an SLE 401 according to the invention in the form of a straight body pillow. In alternative embodiments SLE 401 may take various curved shapes, such as may be seen in commercially available body pillows in an on-line search. The illustration in FIG. 4, however, should be adequate for reference to describe the functions in an embodiment of the present invention.

In the SLE of FIG. 4, the SLE has a nominal length L and a nominal width W. The length is to be at least a substantial portion of the length of a reclining child, and the length may vary in different embodiments for children of different ages and sizes, and for adults as well. The width W may vary in proportions as well. The body of the SLA is of padded material as is known for a body pillow.

SLE 401 in this embodiment has a surface area 402 defined in this example on an upper surface, and area 402 is a substantial portion of the upper surface of the SLE, in this embodiment between 50% to 80%. This proportion may vary in other embodiments. Also, in some embodiments the location of area 402 may be more to one side, and a portion of the side of the SLE, to be more available for proximal contact with a subject.

In this example the area 402 has an underlying heating panel having a heat source 302 and heating elements 303 (see FIG. 3). This heating panel may be under all of the area 402 or just a substantial portion of that area. In this example the heating panel may be turned on and off remotely, such as through application 319 executing on mobile device 317, and may also be controlled as to temperature. The surface temperature of area 402 provided by the heating panel is to simulate the heat at the surface of a living being.

All or a substantial part of the elements illustrated in FIG. 3 are present in the SLE of FIG. 4. In one embodiment one of the seams is a zippered access to be able to access and service internal elements. USB connector 320 allows for programming controller 308. Programming may also be done through wireless communication through mobile device 317. Connector 321 is a charging port for charging a battery within the SLE, indicated as power supply 301 in FIG. 3.

SLE 401 has microphone 315 an speaker 316 in a position that will be proximate the head of a subject lying on or next to and in contact with SLE 401. Microphone 315 may pick up sleeping sounds of a subject, or may in some instances pick up speech or crying sounds of the subject, who may be monitored remotely through microphone 315. Speaker 316 is near microphone 315 and may be used to play soothing music to a subject or in some circumstance speech from a parent or other to a subject through mobile device 317.

SLE 401 has a heartbeat simulator 305 positioned about where a heart would be if the SLE were a living entity. The heartbeat simulator may operate in a number of ways mechanically or pneumatically, and may be regulated in both intensity and rate through mobile app 319 executing on mobile device 317. In this example there is additionally a breath simulator output 304 to simulate breath inhaling and exhaling, both of actual air passage and the sounds of breathing, which sounds may be supplemented through speaker 316. Breath sounds in this example are controlled to a rapid intake and immediate exhale, as is common in a sleeping person or other animal. The rhythm and rate may be controlled through mobile app 319. In some embodiments stretch simulator 306 of FIG. 3 may also be implemented to provide a limited movement of the SLE to mimic movements that a sleeping person or other animal might make.

The SLE may be implemented in a variety of ways within the scope of the invention. In one implementation the SLE may have a body having a length substantially greater than a width, formed of cushioned material, a contact area on an surface of the body exposed with the body lying on a supporting surface, the contact area comprising at least 50% of the exposed surface, a heating panel under the contact area providing heat to regulate temperature of the contact surface, a microphone positioned proximate one end of the exposed surface, a speaker positioned proximate the microphone, a heartbeat simulator positioned centrally on the exposed surface, a breath simulator proximate the microphone and speaker, and a control system within the body comprising a microprocessor, a coupled data repository, a power supply providing power to electrical and electronic elements through electrical conductors, wireless communication circuitry, and a digital bus interconnecting the microprocessor and other digital elements through which control of the digital elements is accomplished. In one implementation the heating panel heats the contact area to a temperature simulating the skin temperature of a living person, the heartbeat simulator provides feeling and sound of a beating heart of a person at rest, the breath simulator provides air intake and exhaust at a rhythm and rate simulating breathing of a person asleep, and the speaker provides sounds of a person sleeping, synchronized with the breath simulator.

In some case the body may be implemented in the form of a stuffed animal, one of which may be a Teddy Bear. In some applications of the power supply is a rechargeable battery with a charging port in a surface of the SLE. In some cases there may be a direct connection to a wall plug, for example. There might also be a USB port providing input for programming the microprocessor of the control system.

In dome implementations there may be a stretch simulator providing small movements of the body. Also in some implementations of the SLE of the invention there may further be a mobile communication device as a part of the control system, in communication with the microprocessor. There may be an application executing on the mobile device providing an interactive interface on a display of the mobile device enabling control of other elements of the control system of the LSE. The interactive interface on a display of the mobile device may provide command inputs enabling raising and lowering of temperature of the heating panel under the contact area. There may also be command inputs enabling changing the rate and strength of the heartbeat simulated. Also command inputs enabling changing the rate, rhythm and sound provided by the breath simulator. Also command inputs enabling playing music through the speaker.

The person of ordinary skill will understand that the actions and characteristics of the SLE described above in various forms are not limited to stuffed animals or simulated body pillows but may be provided by other simulated persons or animals, and the characteristics described may be provided in different circumstances in different combinations. All of the description above is exemplary, and not strictly limiting to the scope of the invention. The invention is limited only by the claims that follow.

We claim:
1. A simulated living entity (SLE), comprising:
a body having a length substantially greater than a width, formed of cushioned material;
a contact area on an exposed surface of the body with the body lying on a supporting surface, the contact area comprising at least 50% of the exposed surface;
a heating panel under the contact area providing heat to regulate temperature of the contact area;
a microphone positioned proximate one end of the exposed surface;
a speaker positioned proximate the microphone;
a heartbeat simulator positioned centrally on the exposed surface;
a breath simulator proximate the microphone and speaker; and
a control system within the body comprising a microprocessor, a coupled data repository, a power supply providing power to electrical and electronic elements through electrical conductors, wireless communication circuitry, and a digital bus interconnecting the micro- processor and other digital elements through which control of the digital elements is accomplished;

wherein the heating panel heats the contact area to a temperature simulating the skin temperature of a living person, the heartbeat simulator provides feeling and sound of a beating heart of a person at rest, the breath simulator provides air intake and exhaust at a rhythm and rate simulating breathing of a person asleep, and the speaker provides sounds of a person sleeping, synchronized with the breath simulator.

2. The SLE of claim 1 wherein the body is in the form of a stuffed animal.

3. The SLE of claim 2 wherein the body is in the form of a Teddy Bear.

4. The SLE of claim 1 wherein the power supply is a rechargeable battery with a charging port in a surface of the SLE.

5. The SLE of claim 1 further comprising a USB port providing input for programming the microprocessor of the control system.

6. The SLE of claim 1 further comprising a stretch simulator providing small movements of the body.

7. The SLE of claim 1 further comprising a mobile communication device as a part of the control system, in communication with the microprocessor.

8. The SLE of claim 7 further comprising an application executing on the mobile device providing an interactive interface on a display of the mobile device enabling control of other elements of the control system of the SLE.

9. The SLE of claim 8 wherein the interactive interface provides command inputs enabling raising and lowering of temperature of the heating panel under the contact area.

10. The SLE of claim 8 wherein the interactive interface provides command inputs enabling changing the rate and strength of the heartbeat simulated.

11. The SLE of claim 8 wherein the interactive interface provides command inputs enabling changing the rate, rhythm and sound provided by the breath simulator.

12. The SLE of claim 8 wherein the interactive interface provides command inputs enabling playing music through the speaker.

* * * * *